United States Patent [19]

Bracke et al.

[11] 4,154,776

[45] May 15, 1979

[54] HIGH IMPACT POLYSTYRENE COMPOSITION

[75] Inventors: William J. I. Bracke, Hamme; Jean N. M. Bertrand, Tervuren; Jacques T. L. Zegers, Brussels, all of Belgium

[73] Assignee: Labofina S.A., Brussels, Belgium

[21] Appl. No.: 734,133

[22] Filed: Oct. 20, 1976

[51] Int. Cl.$^2$ ............................................. C08L 53/02
[52] U.S. Cl. .............................. 260/876 B; 260/877; 260/879; 260/880 R; 260/880 B; 260/886; 260/892; 260/894
[58] Field of Search ............... 260/876 B, 876 R, 892, 260/894

[56] References Cited

U.S. PATENT DOCUMENTS

| | | | |
|---|---|---|---|
| 3,281,383 | 10/1966 | Zelinski et al. | 260/876 B X |
| 3,906,057 | 9/1975 | Durst | 260/870 B |
| 3,907,930 | 9/1975 | O'Grady | 260/876 B |
| 3,907,931 | 9/1975 | Durst | 260/876 B |
| 3,936,365 | 2/1976 | Saunders et al. | 204/159.2 |
| 3,985,702 | 10/1976 | Himes | 260/876 B X |

FOREIGN PATENT DOCUMENTS 1053596  1/1967  United Kingdom ................. 260/876 B

*Primary Examiner*—Thomas DeBenedictis
*Attorney, Agent, or Firm*—Robert J. Koch

[57] ABSTRACT

A composition obtained by mixing polystyrene with a master-batch composition containing a mixture of a vinyl aromatic polymer, a rubbery dienic polymer and a sequenced copolymer of styrene and diene, the total styrene polymer content of this master-batch composition including both the free polystyrene and the polystyrene present in the sequenced copolymer, being between 50 and 80% by weight of the composition, the total rubber content of this master-batch composition, including both the rubbery dienic polymer and the dienic polymer present in the sequenced copolymer being between 20 and 50% by weight of the composition, the sequenced copolymer content being such that it introduces from 3 to 90% by weight of the total rubber in the composition, the total percent rubber content of said master-batch composition being at least 1.5 times the total percent rubber content of the final composition.

11 Claims, No Drawings

HIGH IMPACT POLYSTYRENE COMPOSITION

BACKGROUND OF THE INVENTION

The present invention relates to vinyl aromatic polymer compositions having improved impact strength properties. Further, the present invention relates to a process for preparing the said compositions by mixing of the different constituents.

It is well known that resins obtained from polystyrene as sole constituent have a low impact strength. In order to improve that property, the polystyrene which is hard and rigid, is combined with a rubber which is flexible and elastic. Two processes may be utilized to combine the polystyrene and rubber. One of these processes involves physically mixing polystyrene and rubber. However, the compatibility of the polystyrene and rubber is low and generally, mixing results in the rubber being poorly dispersed in the polystyrene. Rubber agglomerates are more or less finely divided into the polystyrene mass, and the properties of the polystyrene are only slightly improved. In order to increase the impact strength by mixing polystyrene and rubber, a high rubber content is needed. However, in adding high rubber amounts, other desirable properties of polystyrene are unfavorably influenced.

The other method of combining rubber and polystyrene is by grafting styrene on rubber. This method, which often comprises a bulk polymerization followed by a suspension polymerization, requires high investments. Moreover, the grafting process has limitations particularly with respect to the density and the quality of the grafting.

Compositions comprising a vinylaromatic polymer, 1,4 polybutadiene and a statistic polymer of butadiene and styrene (such as GRS) are also known. However, the impact strength properties of such compositions are not as good as is often desired. Other compositions of thermoplastic resins obtained by mixing a homopolymer or a copolymer of styrene with a sequenced copolymer of styrene and butadiene are known, but the impact strength properties of these compositions also do not meet many needs. The feature of this type of composition resides in the fact that the whole rubber present in the resin is grafted. However, if a maximum degree of graft improves tensile strength and bending strength properties, the results show that it harms the impact strength properties.

It is an object of the present invention to provide new and improved high impact polystyrene compositions.

Another object of the present invention is to provide a new and improved high impact polystyrene prepared by mixing.

Still another object of the present invention is to provide a process for mixing the materials necessary to prepare the new and improved high impact polystyrene compositions defined herein.

Additional objects will become apparent from the following description of the invention herein described.

SUMMARY OF THE INVENTION

The present invention which fulfills the above and other objects, is a composition obtained by mixing polystyrene with a master-batch composition containing a mixture of a vinylaromatic polymer, a rubbery dienic polymer and a sequenced copolymer of styrene and diene, the total styrene polymer content of this master-batch composition including both the free polystyrene and the polystyrene present in the sequenced copolymer, being between 50 and 80% by weight of the composition, the total rubber content of this master-batch composition, including both the rubbery dienic polymer and the dienic polymer present in the sequenced copolymer, being between 20 and 50% by weight of the composition, the sequenced copolymer content being so that it introduces from 3 to 90% by weight of the total rubber in the composition, the total percent rubber content of said master-batch composition being at least 1.5 times the total percent rubber content of the final composition.

In another embodiment, the present invention also relates to a process for preparing the above described compositions. Such process comprises mixing in conventional manner, polystyrene with a master-batch composition containing a mixture of a styrene polymer, a rubbery dienic polymer, a sequenced copolymer of styrene and diene, and if desired, a peroxide and other usual additives, the total styrene polymer content of this composition including the free polystyrene and the polystyrene present in the sequenced copolymer and being between 50 and 80% by weight of the composition, the total rubber content of this composition including the rubbery dienic polymer and the dienic polymer present in the sequenced copolymer, and being between 20 and 50% by weight of the composition, the sequenced copolymer content being so that it provides from 3 to 90% by weight of the total rubber in the composition, and the total percent rubber content of the master-batch composition being at least 1.5 times the total percent rubber content of the final composition, and the peroxide content being between 0 and 0.5% by weight of the final composition with the usual additives content being between 0 and 50% by weight of the final composition.

DESCRIPTION OF THE PREFERRED EMBODIMENTS

According to the present invention, the vinylaromatic polymers include not only the homopolymers of styrene but also copolymers prepared from styrene and its derivatives such as styrene halides and alkyl styrenes. The polystyrene content in the final composition may vary between wide limits and depends on the properties which are desired for the final composition. It is well known that the impact strength increases with the rubber content, but the tensile strength and bending strength properties are worse at high rubber content. Therefore, it is preferable that the polystyrene content varies between 80 and 99% by weight, based on the total weight of the composition and particularly between 85 and 95% by weight. The polystyrene content is based on the styrene polymer present as polystyrene plus that contained in the sequenced copolymer.

The rubbery dienic polymer generally consists of a 1,4 diene polymer, particularly polybutadiene, polyisoprene or mixtures thereof. Statistic copolymers of styrene and butadiene may also be used alone or in combination with the rubbery dienic polymer. Generally, the rubber content of the final composition is between 1 and 20% by weight, based on the total weight of the composition and preferably between 5 and 15% by weight; however, in the master-batch composition the rubber content is greatly higher and is generally between 20 and 50% by weight and preferably between 30 and 40% by weight based on the total weight of the composition. The rubber content includes that present in a homopolymer (dienes), a statistical polymer (GRS) and the sequenced copolymer. It is well known that the rubber content depends on the desired properties. For a high rubber content, the impact strength properties of the compositions are greatly improved but to the detriment of the other physical properties such as tensile strength and bending strength. Therefore, the optimum rubber content is selected with a view toward obtaining sufficient impact strength properties while retaining other properties within satisfactory limits.

The main role of the sequenced copolymer is to bring about the formation of a homogeneous dispersion of the rubbery polymer into polystyrene and to promote good attachment of the rubber phase into the polystyrene phase. In order to fulfill those conditions, the sequenced copolymer contains at least a polystyrene chain and at least a diene polymer chain, and it may be of the di-block type A-B or of the ter-block type A-B-A or B-A-B wherein A is a polystyrene chain and B is a polybutadiene chain, or still of the radial type, or their mixtures. A radial copolymer may be represented as being constituted of at least 3 branches of a di-block copolymer, each branch comprising a segment of diene polymer with at an extremity, a segment of polystyrene. The other extremity is linked to other similar branches. Such a block copolymer may be prepared according to the process described in the U.S. Pat. No. 3,281,383.

The quality of the compositions of the invention depends on the molecular weight and on the composition of the sequenced polymer and also on its content in the final composition. Particularly advantageous results are obtained when the sequenced copolymer comprises polystyrene chains and diene polymer chains, each having a molecular weight of at least 5,000 and which does not exceed 1,000,000. The weight ratio of polystyrene to rubber in the sequenced polymer generally is between 0.2 and 5. A sequenced copolymer being too low in polystyrene or rubber content acts as pure polystyrene or pure rubber and not as a dispersing agent. The sequenced copolymer such as hereabove defined, is used in an amount such that it provides from 3 to 90% by weight of total rubber in the composition.

A peroxide also may be added in the master-batch composition in order to improve the linkage of the rubber, and therefore to improve the impact strength properties of the composition. The choice of the peroxide depends on the operating conditions and mainly on the temperature, the residence time in the mixer and on the mixer type. Exemplary of useful peroxides are cumyl hydroperoxide, tert-butyl hydroperoxide, dicumyl hydroperoxide, and the like. The amount of peroxide useful to improve the linkage of the rubber particles generally does not exceed 0.5% by weight based on the total weight of the composition.

The composition of the invention may also contain one or more additives normally present in the polystyrene based compositions. These additives are for instance anti-oxidizing agents, lubricating agents, dyeing matters, inert fillers, fire-proofing agents and anti-static agents.

The method of mixing which forms a part of the present invention comprises mixing by conventional method such as extrusion, the components described above in the amounts specified. With regard to the classical suspension polymerization process, this type of process presents the advantage of avoiding the use of a suspension agent and of suppressing the necessity of purifying the waters before and after the reaction.

Moreover, the mixing process allows a wide latitude with respect to the operating conditions. With respect to mixing, many factors may vary, such as for instance, temperature, residence time in the mixer, shearing intensity, viscosity, nature of the sequenced copolymer, chain length of the sequenced copolymer, the amount and the nature of the cross-linking agent. Further, this mixing process is much more simple and permits avoidance of suspension problems, bead drying and problems regarding the introduction of the various additives.

The mixing process generally is carried out by the use of mechanical mixing wherein the compounds are in a melt state. This mixing may be carried out in the presence of a solvent, which is subsequently eliminated. This solvent may be styrene monomer resulting from the residual styrene contained in the crystal polystyrene. The intensity of mixing and the mixing time will depend on the materials used and on the degree of homogenity desired for the mixture. The compositions of the present invention may be prepared according to a continuous process which merely consists in using a double screw extruder having a heating system. The extruder is continuously fed with fluid polystyrene or polystyrene beads, rubber and sequenced copolymer, in the proportions hereabove defined.

In order to further describe and to illustrate the present invention, the following examples are presented.

For these experiments (and except as otherwise stated) a sequenced copolymer of styrene and butadiene of the radial type whose total molecular weight is 160,000 (the polybutadiene part is 60% and the polystyrene part is 40%) is used. The total polybutadiene content includes that of polybutadiene used as one of the constituents of the mixture and that of polybutadiene present in the sequenced copolymer. The impact strength of the product has been determined in accordance with the Falling Dart method, described in ASTM D 3029-72, but on plates having 2 mm thickness, the size of the extremity of the weight being 12.7 mm.

EXAMPLE 1

Several compositions were prepared from master-batches having different polybutadiene contents. These compositions were carried out by diluting the master-batch with polystyrene in order to have a 10% by weight rubber content in the final composition. The master-batches and the final compositions were obtained by mixing the different constituents in a conventional mixer. These compositions were compared to a composition having the same final rubber content but prepared without the use of a master-batch. The amounts of the different constituents were expressed in percentage by weight.

| Experiments | 1 | 2 | 3 | Ref. |
|---|---|---|---|---|
| Master-batch | | | | |
| Polystyrene | 65.2 | 53.6 | 42 | — |
| Polybutadiene | 22.8 | 30.4 | 38 | — |
| Sequenced copolymer | 12 | 16 | 20 | — |
| Total polystyrene | 70 | 60 | 50 | — |
| Total polybutadiene | 30 | 40 | 50 | — |
| Dicumyl hydroperoxide ppm | 300 | 400 | 500 | — |
| Final composition | | | | |
| Polystyrene | 88.4 | 88.4 | 88.4 | 88.4 |
| Polybutadiene | 7.6 | 7.6 | 7.6 | 7.6 |
| Sequenced copolymer | 4 | 4 | 4 | 4 |
| Total polystyrene | 90 | 90 | 90 | 90 |
| Total polybutadiene | 10 | 10 | 10 | 10 |

| Experiments | 1 | 2 | 3 | Ref. |
|---|---|---|---|---|
| Dicumyl hydroperoxide ppm | 100 | 100 | 100 | 100 |
| Falling Dart (inch/lb) | 28 | 22 | 17 | 16 |

EXAMPLE 2

Several compositions were prepared from master-batches having different polybutadiene contents and different sequenced copolymer contents. These compositions were carried out by diluting the master-batch with polystyrene in order to have a 10% by weight rubber content in the final composition. The master-batches and the final compositions were obtained by mixing the different constituents in a conventional mixer. These compositions were compared in impact strength compositions having the same final rubber content and the same sequenced copolymer content but prepared without the use of a master-batch. The amounts of the different constituents were expressed in percentage by weight.

| Experiments | 1 | Ref. | 2 | 3 | 4 | Ref. | 5 | 6 | 7 | Ref. |
|---|---|---|---|---|---|---|---|---|---|---|
| Master-batch | | | | | | | | | | |
| Polystyrene | 67.6 | — | 62.8 | 50.4 | 38 | — | 60.4 | 57.2 | 34 | — |
| Polybutadiene | 26.4 | — | 19.2 | 25.6 | 32 | — | 15.6 | 20.8 | 26 | — |
| Sequenced copolymer | 6 | — | 18 | 24 | 30 | — | 24 | 32 | 40 | — |
| Total polystyrene | 70 | — | 70 | 60 | 50 | — | 70 | 60 | 50 | — |
| Total polybutadiene | 30 | — | 30 | 40 | 50 | — | 30 | 40 | 50 | — |
| Dicumyl peroxide (ppm) | 300 | — | 300 | 400 | 500 | — | 300 | 400 | 500 | — |
| Final composition | | | | | | | | | | |
| Polystyrene | 89.2 | 89.2 | 88.6 | 88.6 | 88.6 | 88.6 | 86.8 | 86.8 | 86.8 | 86.8 |
| Polybutadiene | 8.8 | 8.8 | 6.4 | 6.4 | 6.4 | 6.4 | 5.2 | 5.2 | 5.2 | 5.2 |
| Sequenced copolymer | 2 | 2 | 6 | 6 | 6 | 6 | 8 | 8 | 8 | 8 |
| Total polystyrene | 90 | 90 | 90 | 90 | 90 | 90 | 90 | 90 | 90 | 90 |
| Total polybutadiene | 10 | 10 | 10 | 10 | 10 | 10 | 10 | 10 | 10 | 10 |
| Dicumyl peroxide (ppm) | 100 | 100 | 100 | 100 | 100 | 100 | 100 | 100 | 100 | 100 |
| Falling Dart (inch.lb) | 7 | 3 | 30 | 27 | 20 | 8 | 30 | 16 | 24 | 2 |

This example shows that for any sequenced copolymer content, the Falling Dart is improved when compared with a composition having the same rubber content and the same sequenced copolymer content but prepared without the use of a master-batch.

EXAMPLE 3

Several compositions were prepared from master batches having a polybutadiene content of 30% by weight. These compositions were carried out by diluting the master-batch with polystyrene in order to obtain a 10% by weight rubber content in the final composition. The master-batches and the final compositions were prepared by mixing the different constituents in a conventional mixer. The sequenced copolymer is a copolymer of styrene and butadiene wherein the molecular weights of the polystyrene chains and polybutadiene chains are respectively $10^5$ and $5 \times 10^4$. These compositions were compared to compositions having the same rubber content and the same sequenced copolymer content but prepared without the use of a master-batch. The amounts of the different constituents are expressed in percentage by weight.

| Experiments | 1 | Ref. | 2 | Ref. |
|---|---|---|---|---|
| Master-batch | | | | |
| Polystyrene | 66 | — | 64 | — |
| Polybutadiene | 28 | — | 27 | — |
| Sequenced copolymer | 6 | — | 9 | — |
| Total polystyrene | 70 | — | 70 | — |
| Total polybutadiene | 30 | — | 30 | — |
| Dicumyl peroxide (ppm) | 300 | — | 300 | — |
| Final composition | | | | |
| Polystyrene | 88.66 | 88.66 | 88 | 88 |
| Polybutadiene | 9.33 | 9.33 | 9 | 9 |
| Sequenced copolymer | 2 | 2 | 3 | 3 |
| Total polystyrene | 90 | 90 | 90 | 90 |
| Total polybutadiene | 10 | 10 | 10 | 10 |
| Dicumyl peroxide (ppm) | 100 | 100 | 100 | 100 |
| Falling Dart (inch.lb) | 23 | 4 | 23 | 6 |

This example shows the improvement of the Falling Dart, when another sequenced copolymer is used.

EXAMPLE 4

A final composition containing 15% by weight of polybutadiene was prepared from a master-batch having a polybutadiene content of 30% by weight. The final composition was obtained by diluting the master-batch with polystyrene. The master-batch and the final composition were obtained by mixing the constituents in a conventional mixer. The sequenced copolymer was a copolymer of styrene and butadiene wherein the molecular weights of the polystyrene chains and polybutadiene chains were respectively $10^5$ and $5 \times 10^4$. This sequenced copolymer was used in an amount corresponding to 20% by weight based on the total rubber weight. This composition was compared to a composition having the same rubber content and the same sequenced copolymer content, but without the use of a master-batch.

| Experiment | 1 | Ref. |
|---|---|---|
| Master-batch | | |
| Polystyrene | 66 | — |
| Polybutadiene | 28 | — |
| Sequenced copolymer | 6 | — |
| Total polystyrene | 70 | — |
| Total polybutadiene | 30 | — |
| Dicumyl peroxide (ppm) | 300 | — |
| Polystyrene | 83 | 83 |
| Polybutadiene | 14 | 14 |
| Sequenced copolymer | 3 | 3 |
| Total polystyrene | 85 | 85 |
| Total polybutadiene | 15 | 15 |
| Dicumyl peroxide (ppm) | 150 | 150 |
| Falling Dart (inch.lb) | 23 | 4 |

This example shows that for different rubber content in the final composition, an important improvement of the Falling Dart is observed when the final composition is prepared with the use of a master-batch

EXAMPLE 5

A final composition containing 10% by weight of rubber was prepared from a master-batch having a rubber content of 30% by weight, wherein the major amount of rubber was provided by the sequenced copolymer. The final composition was carried out by diluting the master-batch with polystyrene. The master-batch and the final composition were obtained by mixing the constituents in a conventional mixer. The sequenced copolymer was a copolymer of styrene and butadiene of the radial type containing 60% by weight of polybutadiene and having a total molecular weight of 160,000. The amount of sequenced copolymer was such that it provided 60% by weight of the total rubber. This composition was compared to a composition having the same rubber content and the same sequenced copolymer content, but prepared without the use of a master-batch. The amounts of the different constituents were expressed in percentage by weight.

| Experiments | 1 | Ref. |
| --- | --- | --- |
| Master-batch | | |
| Polystyrene | 58 | — |
| Polybutadiene | 12 | — |
| Sequenced copolymer | 30 | — |
| Polybutadiene of sequenced | | |
| Total polybutadiene | 60 | — |
| Total polystyrene | 70 | — |
| Total polybutadiene | 30 | — |
| Dicumyl peroxide (ppm) | 300 | — |
| Final composition | | |
| Polystyrene | 86 | 86 |
| Polybutadiene | 4 | 4 |
| Sequenced copolymer | 10 | 10 |
| Polybutadiene of sequence | | |
| Total polybutadiene | 60 | 60 |
| Total polystyrene | 90 | 90 |
| Total polybutadiene | 10 | 10 |
| Dicumyl peroxide (ppm) | 100 | 100 |
| Falling Dart (inch.lb) | 34 | <1 |

This example shows that when the major amount of the rubber is provided by the sequenced copolymer, significant improvement in the Falling Dart property is observed when the final composition is prepared with the use of a master-batch.

EXAMPLE 6

A double screw extruder of the Creuzot-Loire type was continuously fed with crystal polystyrene, polybutadiene and a sequenced copolymer of styrene and butadiene of the radial type containing 60% by weight of polybutadiene and having a total molecular weight of 160,000. The flow rates of polystyrene, polybutadiene and sequenced copolymer were respectively 7.9 kg/hr, 2.9 kg/hr, and 1.2 kg/hr. The master-batch composition obtained was continuously introduced into a mono screw extruder of the Creuzot-Loire type wherein it was mixed with crystal polystyrene introduced at a flow rate of 24 kg/hr. The mass temperature in the extruder was 230° C. and the total residence time was 40 seconds. The Falling Dart properties of this composition were compared to those of a composition having the same rubber content and the same sequenced copolymer content, prepared according to a continuous process but without the use of a master-batch.

| Experiment | 1 | Ref. |
| --- | --- | --- |
| Falling Dart (inch.lb) | 20 | 9 |

What is claimed is:

1. A composition obtained by mixing polystyrene with a master-batch composition consisting essentially of a mixture of a vinyl aromatic polymer, a rubbery dienic polymer and a sequenced copolymer of styrene and diene, the total styrene polymer content of this master-batch composition including both the free polystyrene and the polystyrene present in the sequenced copolymer, being between 50 and 80% by weight of the composition, the total rubber content of this master-batch composition, including both the rubbery dienic polymer and the dienic polymer present in the sequenced copolymer being between 20 and 50% by weight of the composition, the sequenced copolymer content being so that it introduces from 3 to 90% by weight of the total rubber in the composition, the total percent rubber content of said master-batch composition being at least 1.5 times the total percent rubber content of the final composition.

2. The composition of claim 1 wherein said vinyl aromatic polymer is polystyrene.

3. The composition of claim 1 wherein said rubbery dienic polymer is a 1,4 diene polymer.

4. The composition of claim 3 wherein said 1,4 diene polymer is one selected from the group consisting of polybutadiene, polyisoprene and mixtures thereof.

5. The composition of claim 1 wherein the sequenced copolymer contains at least a polystyrene chain and at least a diene polymer chain.

6. The composition of claim 5 wherein said sequenced copolymer is selected from the group consisting of the di-block type A-B, the ter-block type A-B-A, ter-block type B-A-B wherein A is a polystyrene chain and B is a polybutadiene chain.

7. The composition of claim 1 wherein said sequenced copolymer comprises polystyrene chains and diene polymer chains, each having a molecular weight of at least 5,000, but not above 1,000,000.

8. The composition of claim 1 wherein said sequenced copolymer has a polystyrene to rubber weight ratio between 0.2 and 5.

9. The composition of claim 1 wherein a peroxide is added to the master-batch composition.

10. The composition of claim 9 wherein said peroxide is one selected from the group consisting of cumyl hydroperoxide, tert-butyl hydroperoxide, dicumyl hydroperoxide and combinations thereof.

11. The composition of claims 9 and 10 wherein the amount of said peroxide does not exceed 0.5% by weight of the composition.

* * * * *